United States Patent [19]
Gray

[11] 3,983,196
[45] Sept. 28, 1976

[54] METHOD OF INJECTION MOLDING STRUCTURAL FOAM HAVING ACCURATE MOLD SURFACE REPRODUCTIONS

[75] Inventor: Charles H. Gray, Port Lambton, Canada

[73] Assignee: The Dow Chemical Company, Midland, Mich.

[22] Filed: July 18, 1974

[21] Appl. No.: 489,676

Related U.S. Application Data

[63] Continuation-in-part of Ser. No. 234,028, March 13, 1972, abandoned.

[52] U.S. Cl. .................. 264/45.5; 264/54; 264/328; 264/DIG. 5; 264/DIG. 83; 425/817 R
[51] Int. Cl.² .................. B29D 27/00; B29F 1/06
[58] Field of Search ............ 264/DIG. 83, 328, 54, 264/DIG. 5, 45.5; 425/817 R

[56] References Cited
UNITED STATES PATENTS

| | | | |
|---|---|---|---|
| 3,268,636 | 8/1966 | Angell | 264/DIG. 83 |
| 3,436,446 | 4/1969 | Angell | 264/DIG. 83 |
| 3,632,729 | 1/1972 | Bielfeldt | 264/328 X |
| 3,767,742 | 10/1973 | Robin | 264/328 X |
| 3,825,637 | 7/1974 | Robin | 264/328 X |

OTHER PUBLICATIONS
Czerski, J., "Injection–Moulded Foams." In Plastics & Polymers, Dec. 1971, pp. 406–411.

Primary Examiner—Philip Anderson
Attorney, Agent, or Firm—Robert B. Ingraham

[57] ABSTRACT

A settable foam plastic product being formed in a mold cavity is compressed, after a film has formed on the surface of the product, but before final setting of the product. This compression step, which is carried out by reducing the volume of the mold cavity, has the advantage of increasing the accuracy of reproduction of fine surface detail. The compression step also permits stops to be readily removed to enable subsequent full opening of the mold cavity. This use of movable stops in turn facilitates absorption of the forces encountered during the injection step with less massive machine structure than heretofore, resulting in the possibility of economical manufacture of larger products. The machine also includes an improved mold cavity construction in which the parting planes are perpendicular to the main plane of the product, and incorporating laterally movable end and side mold members to facilitate removal of the product and the formation of surface detail on edge surfaces of the product. The machine is also fitted with injection nozzles that incorporate a plunger as well as a valving action.

6 Claims, 17 Drawing Figures

METHOD OF INJECTION MOLDING STRUCTURAL FOAM HAVING ACCURATE MOLD SURFACE REPRODUCTIONS

The present application is a continuation-in-part of my previous application Ser. No. 234,028, filed Mar. 13, 1972 and now abandoned.

The present invention relates to a method for the injection molding of foam thermoplastic synthetic resinous products. In recent years, expansible polystyrene and other thermoplastic settable plastics materials have been developed that can be molded into a product having a foamed core surrounded by a relatively hard and smooth surface skin. This skin is capable of being formed with a fine texture, such as a simulated wood grain. The weight of the article tends to be light, since the internal foaming action substantially reduces the overall density of the product.

Such molding foam processes are now well known in the art. A number of companies have developed variations of the method and of the plastic substances used therefor. Typical examples of United States patents disclosing processes of this type and machines for the carrying out of such processes are U.S. Pat. Nos. 3,058,161 issued to C. E. Beyer et al. Oct. 16, 1962; U.S. Pat. No. 3,268,636 issued to R. G. Angell, Jr., Aug. 23, 1966; U.S. Pat. No. 3,436,446 issued to R. G. Angell, Jr., Apr. 1, 1969; and U.S. Pat. No. 3,211,605 issued to A. Spaak et al. Oct. 12, 1965, the teachings of which are herewith incorporated by reference thereto.

The present invention is concerned with improved methods of injection molding a foam thermoplastic plastic material of this general type. The invention is applicable to the so-called low pressure or to the so-called high pressure system of processing "structural foam".

There is a wide potential use for foam plastic products in many areas of industry. They have already been extensively used in the manufacture of furniture and appliances, for example, as panels for such products as phonograph cabinets, television consoles and the like. This type of product is also especially well suited to the manufacture of doors and building panels both decorative and structural. Indeed, there is theoretically no reason why an entire wall of a house or other structure could not be manufactured from injection molded foam plastic products. They have the advantage of being inclusion of intermediate materials such as thermal insulation.

The main limitation in expansion of the size of such products in the past has been the corresponding size of the injection molding machine required. As the size of the product increases, the cost of the machine increases at a greater than proportional rate, since it is not only necessary to increase the size of the machine merely to accommodate the larger external dimensions of the product. The greater these dimensions become, the greater the forces that are involved during the injection process. These forces become very large, with the consequence that the machine parts have to be of massive construction to be able to withstand such forces without damage to the machine or without the introduction of inaccuracies beyond the tolerances permitted for the product.

One object of the preferred form of the present invention is to provide improvements in injection molding methods that will reduce this difficulty and permit satisfactory products to be made with less massive machinery. Since lighter machinery is cheaper, the present improvements can lead to the manufacture of foam plastic products, and particularly those of comparatively large dimensions, on a more viable economic basis than has hitherto been possible.

Another object of the invention is to provide an injection molding method that will result in improved products, especially in respect of improvements in surface detail.

The invention also incorporates other aspects of improvement of the use of an injection molding machine, and these will become apparent from the specific description that follows. This description, which is to be read in conjuction with the accompanying drawings, describes embodiments of the present invention. It is to be understood that these embodiments are furnished by way of example only and not by way of limitation of the broad scope of the present invention, which scope is defined in the appended claims.

The machine shown in FIGS. 1–4 consists of four posts or rigid connecting means 10 firmly mounted in a bed plate 11. Collars 12 on the posts 10 serve to mount a fixed lower or first platen 13. The molding area on this platen is defined by a pair of mold cavity side blocks 14 and a pair of mold cavity end blocks 15 that extend between opposite ends of the respective blocks 14, as best appreciated from the FIG. 4.

Figure 4:
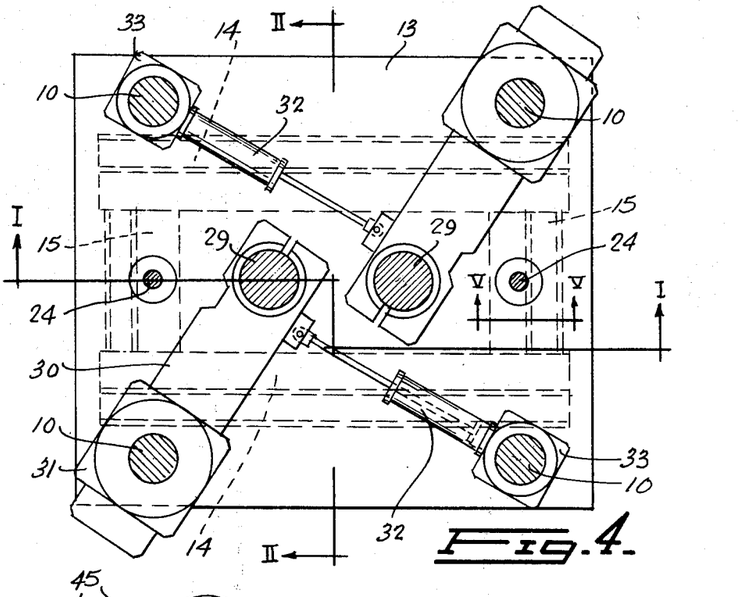
FIG. 4 is a horizontal section taken on the line IV—IV in FIG. 1.

In the rectangular space defined within these mold cavity blocks 14 and 15, there is located a lower or first mold member 16 which is connected to a lower backup plate 17, which, in turn, is mounted on the lower platen 13, a layer of thermal insulation such as asbestos 18 being interposed. The lower mold member 16 is shaped to define the lower surface of a mold cavity 19, in which the product is to be formed.

The upper surface of the cavity 19 is defined by an upper or second mold member 20 which is mounted on an upper or first back-up plate 21, this back-up plate 21 being secured to a movable upper platen 22. The platens 13 and 22 are disposed in generally parallel spaced apart opposed relationship. This movable platen 22 is slidably mounted on the posts 10 by means of sleeves 23, vertical movement (i.e. movement in a direction normal to the planes of the platen and parallel to the posts 10) of this platen being controlled by rods 24 connected to pistons 25 that form part of linear actuator cylinder assembly 26 such as a hydraulic cylinder mounted on a fixed upper support platen 27 secured to the heads of the posts 10.

Figure 13:
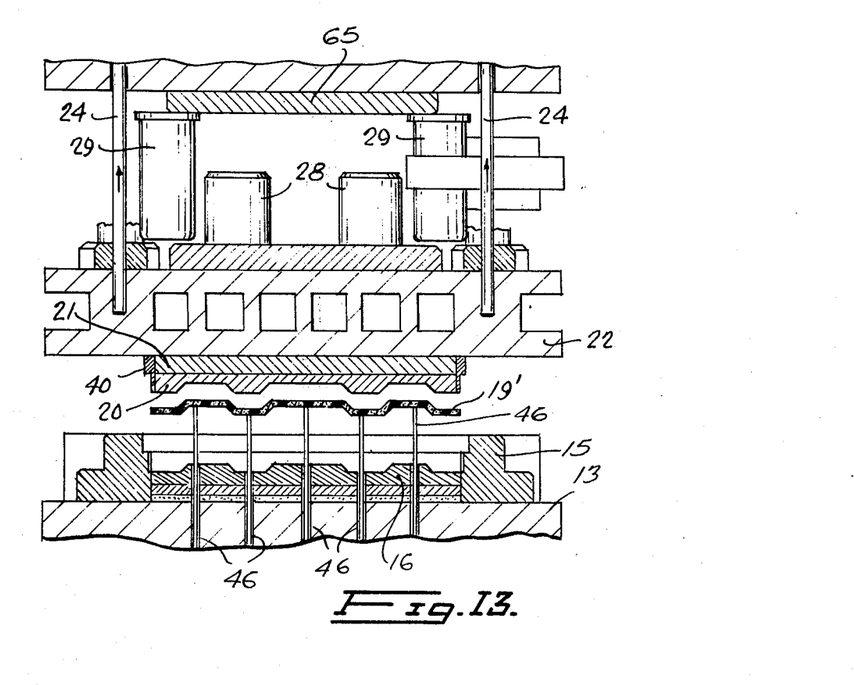

On its upper surface, the movable platen 22 carries a pair of support blocks 28 for cooperation with a pair of stop blocks 29. Each stop block 29 is mounted on an arm 30 (FIG. 4) which is freely pivotally mounted on one of the posts 10 between a pair of fixed collars 31, which thus serve to locate the arms 30 in the vertical direction. Each of the arms 30 is movable in an anti-clockwise direction from the position seen in FIG. 4 under the control of a piston and cylinder assembly 32 that is pivotally mounted on another pair of the posts 10, in this case between fixed collars 33, thereby forming a stop means. Such rotation of the arms 30 will be sufficient to move the stop blocks 29 out of vertical alignment with the support blocks 28, thus permitting elevation of the upper platen 22 from the position shown in FIGS. 1 and 2, to that seen in FIG. 13.

Figures 5, 6:
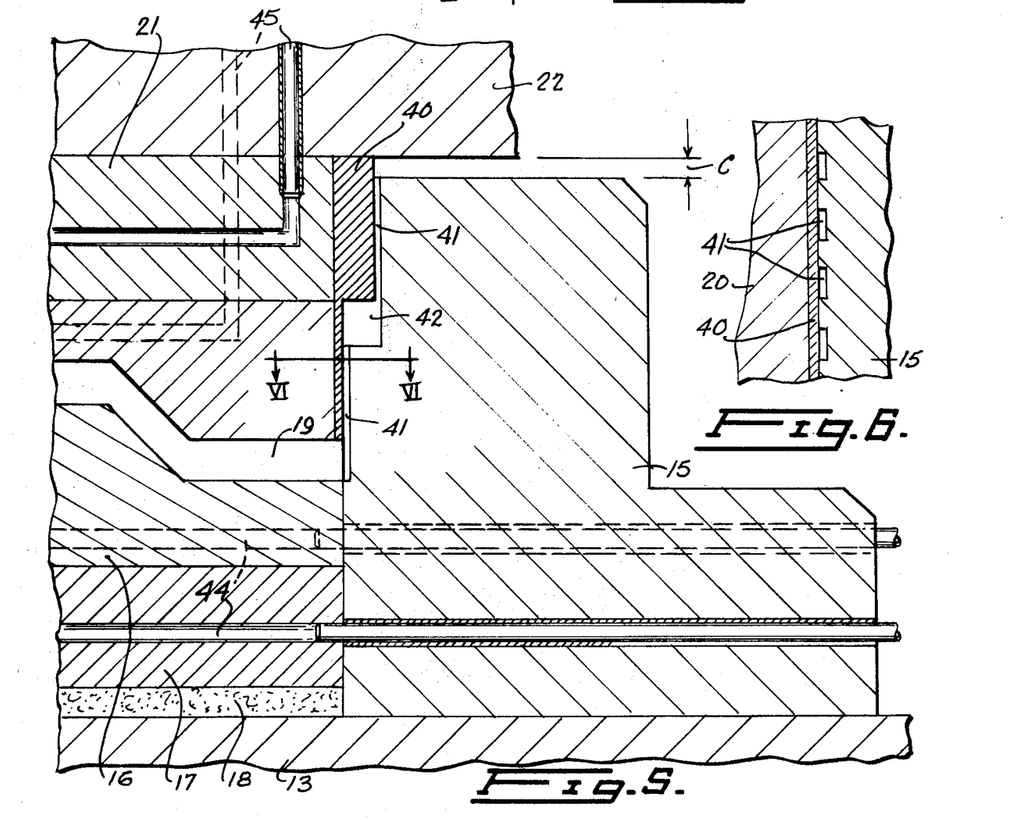
FIG. 5 is an enlarged portion of the machine taken on the line V—V in FIG. 4.
FIG. 6 is a fragmentary section taken on the line VI—VI in FIG. 5.

Further detail of the construction of a typical end block 15 are shown in FIGS. 5 and 6. Secured to the end of the upper mold member 20 and the upper back-up plate 21 is an end wear plate 40. This plate 40 is formed with a series of vents 41 which extend vertically between the wear plate 40 and the end block 15. At an intermediate location, each vent 41 widens out into a chamber 42. These vents 41 are provided for the conventional reason of allowing escape of air during the injection molding process. They are of fine dimensions and will not normally allow any appreciable escape of the heat softened plastic material forming the article being molded. The chambers 42 are furnished to permit downward movement of the wear plate 40 relative to the block 15 in the manner described below.

A similar wear plate 40 is provided at the other end of the mold cavity. Along the sides of the mold cavity defined by the side blocks 14, similar wear plates 43 may be provided. The plates 43 are shown on small scale in FIG. 2, no large scale illustration of these plates having been provided, since they are essentially the same as the wear plates 40, incorporating vents 41 and air chambers 42.

Conventional water lines 44 and 45 for controlling the temperature conditions (heating and/or cooling) extend through the parts 15, 16, 17 and through the parts 20, 21 and 22.

Figure 7:
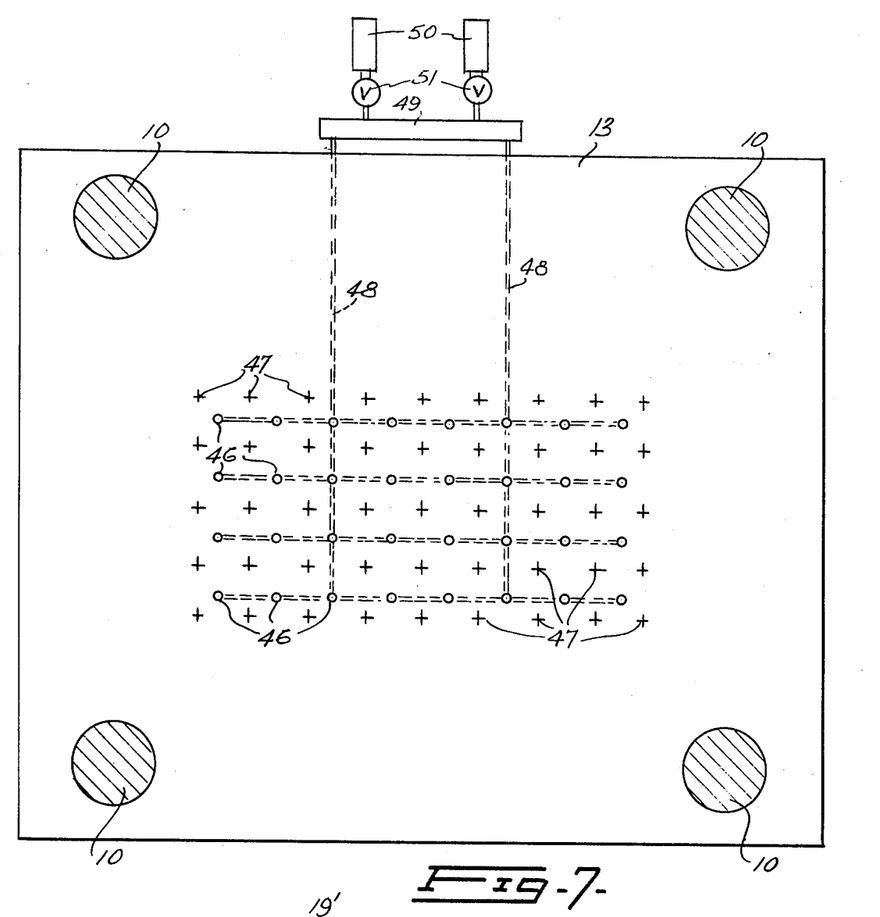
FIG. 7 is a horizontal section taken on the line VII—VII in FIG. 1 with certain parts omitted for clarity.

FIG. 7 illustrates somewhat diagramatically how the lower platen 13 will be furnished with an array of injection nozzles 46 or means to supply heat plastified synthetic resinous composition which foam under atmospheric pressure and ejector pins 47.

This lower platen 13 will be heated in a conventional manner to form a hot manifold. The injection nozzles 46 are connected through a network of conduits 48 extending through the platen 13 from a header 49 supplied with flowable foamable plastic material under pressure from extruders 50 through valves 51. For simplicity, only a single extrusion nozzle 64 has been shown in FIG. 1, but it will be apparent from FIG. 7 that there is in fact a number of these nozzles distributed over the assembly. In a similar manner, FIG. 1 illustrates only a single ejector pin 47, but again FIG. 7, in which these pins 47 are each represented simply by a cross, shows that there are many such pins disposed in an array between and around the location of the injection nozzles 46.

Figure 1:
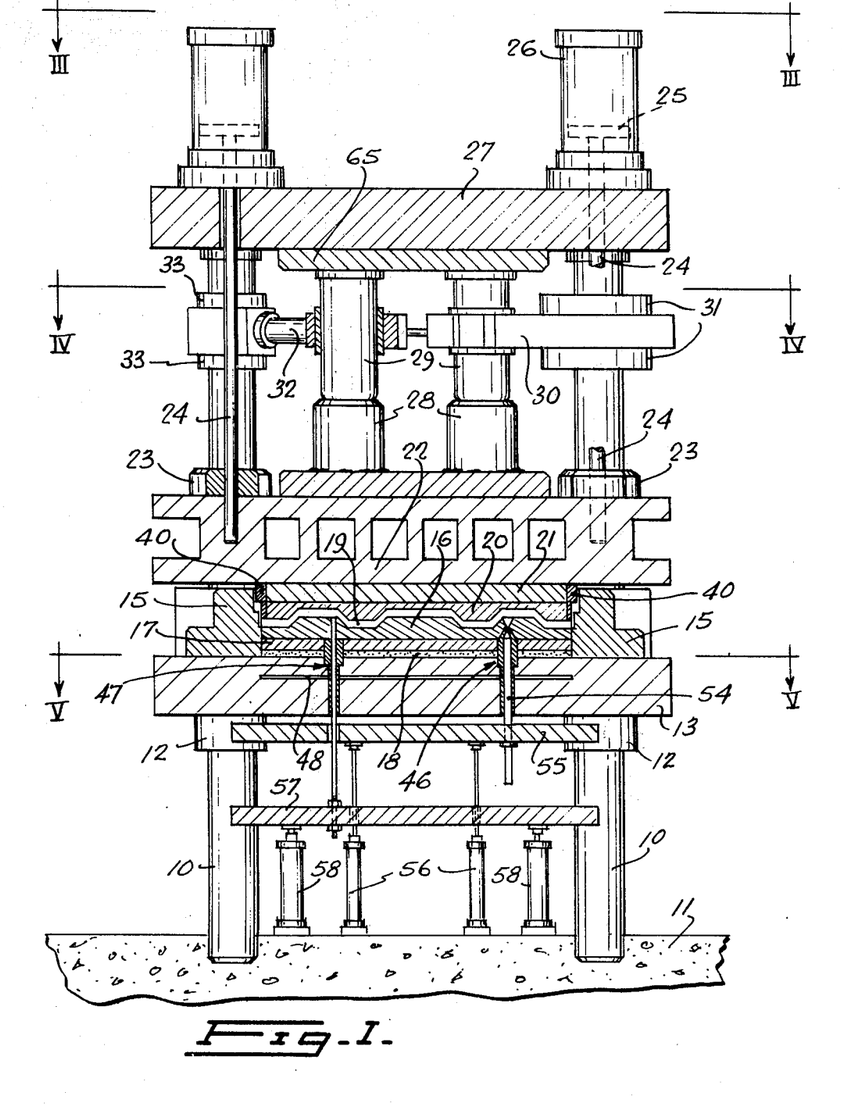
FIG. 1 is a vertical section through an injection molding machine, taken on the line I—I in FIG. 4.
Figure 2:
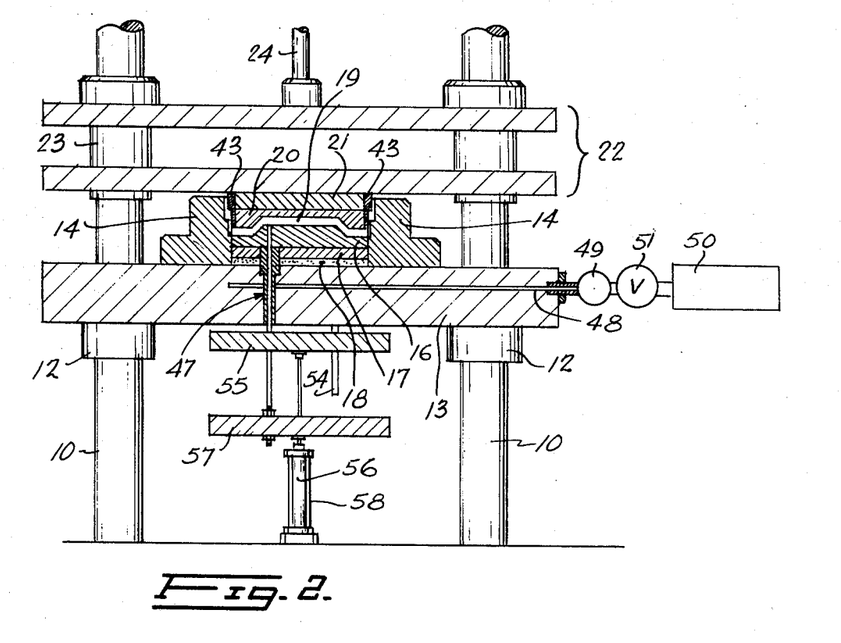
FIG. 2 is a transverse section of the lower part of this machine, taken on a line II—II in FIG. 4.
Figure 3:
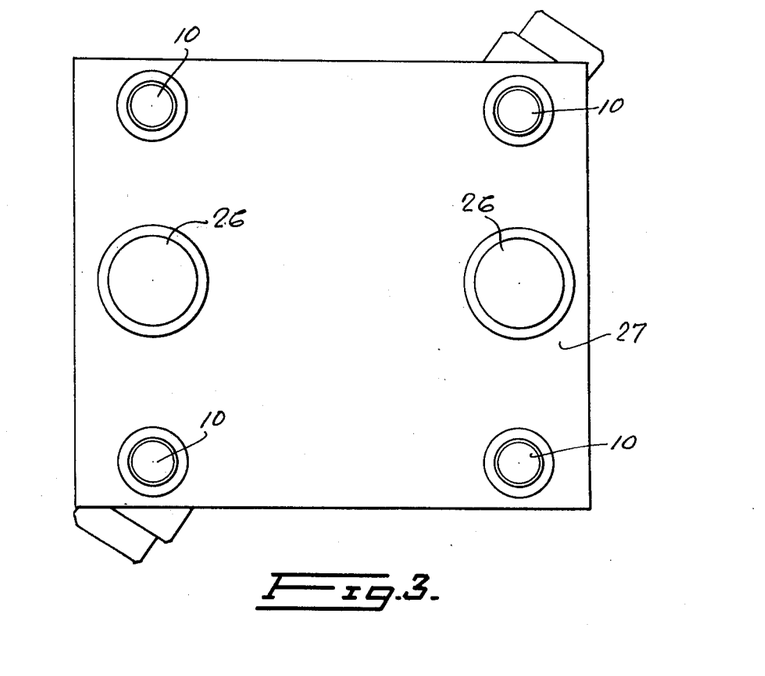
FIG. 3 is a plan view of the machine, taken on a line III—III in FIG. 1.
Figures 8, 9:
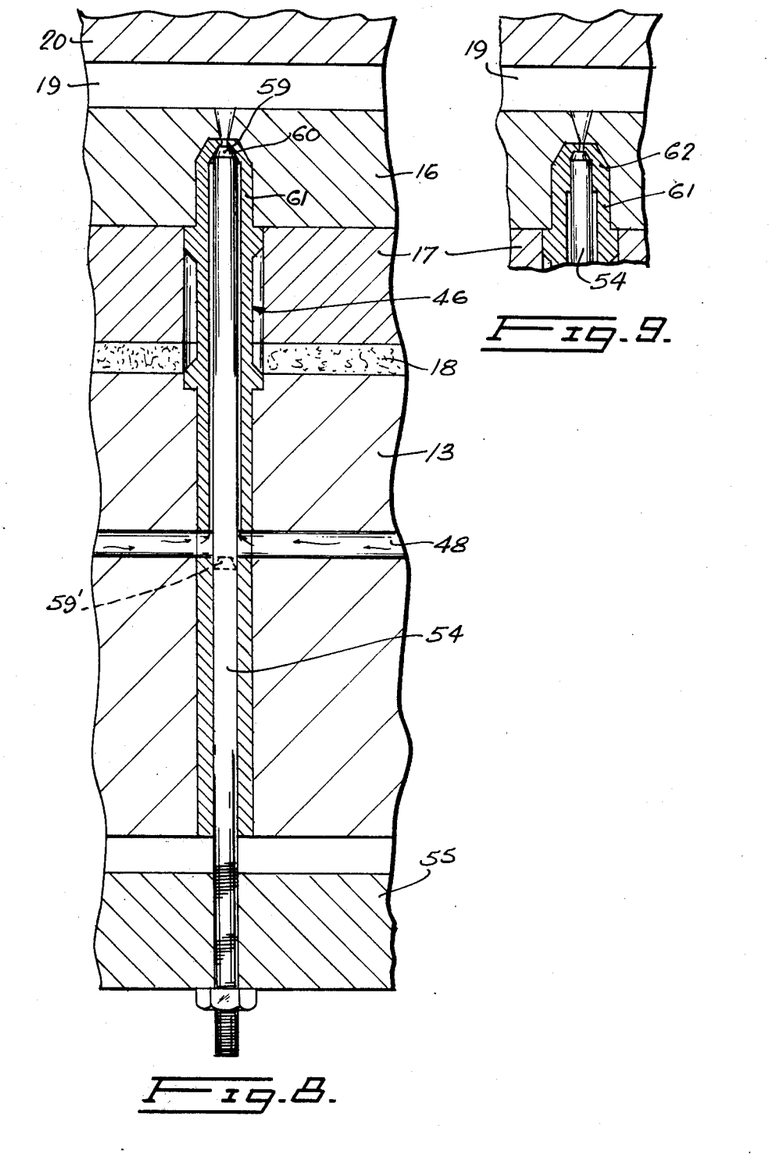
FIG. 8 is a fragmentary, enlarged, sectional view illustrating an injection nozzle assembly.
FIG. 9 is a fragment of FIG. 8, illustrating an alternative construction.

As best seen in FIGS. 1 and 8, injection nozzle 46 has a pin 54, these pins being connected to a common injection nozzle plate 55 mounted for vertical movement under the control of piston and cylinder assemblies 56. In a like manner the ejector pins 47 are all connected to a common ejector plate 57 which is mounted for vertical movement by piston and cylinder assemblies 58.

Details of the structure of each injection nozzles 46 are shown in FIG. 8. The pin 54 is formed at its head with a frustoconical head 59 which acts as a valve by seating against a correspondingly conical end surface 60 of a tube 61 which extends through the parts 16, 17, 18 and 13. Prior to an injection step, the plate 55 is lowered to withdraw the pin 54 and bring its head to the dotted line position shown at 59' in FIG. 8. When the valves 51 are now opened to allow high pressure material to flow from the extruders 50, such material will travel along the conduits 48 and up the tube 61 of each injection nozzle 46 to pass into the molding cavity 19. The tubes 61 and the pins 54 can be heated to facilitate this flow. When the mold has been filled in this way and the valves 51 closed again, the plate 55 can be elevated to bring the head 59 of the pin 54 again into engagement with its seating 60 and hence close the molding cavity 19. At this time, any excess plastic material in the tube 61 can escape back into the conduit 48, since the pin 54 is smaller in diameter than the inside of the tube 61 and clearance is thus provided. Suitable valve means can be provided associated with the valves 51 for venting such return flow, if necessary. The pin 54 may include a heating element embedded in it for temperature control of the plastic material.

As an alternative, and as illustrated in FIG. 9, the upper portion of the tube 61 can be formed with a smaller diameter portion 62 in which the pin 54 is a tight fit. As a result, during the last portion of the upward stroke of the pin 54, its head will act as a plunger to force further material into the cavity 19 and increase the compaction of material therein.

Figure 10:
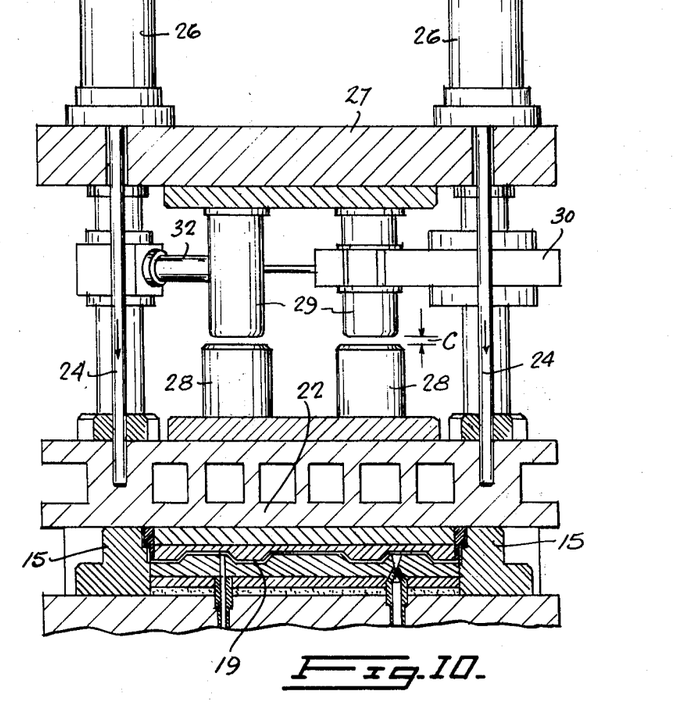
FIG. 10 is a side view of the machine of FIGS. 1 to 7 illustrating a first step in an injection molding method.

FIGS. 10 to 13 illustrate a sequence of steps for carrying out a molding operation. In the initial condition seen in FIG. 10, the mold cavity 19 is empty and the cylinders 26 have been operated to permit their pistons to move to the bottom ends of their strokes, so as to bring the movable platen 22 firmly down against the side and end blocks 14 and 15. The upper surfaces of these blocks define a common plane, which is the lowest plane that can be occupied by the under-surface of the movable platen 22. In this condition, the upper surfaces of the support blocks 28 are spaced below the under-surfaces of the stop blocks 29 by a clearance C. At this time, the depth of the molding cavity 19 is reduced by a similar distance below its value when the molding step is carried out. In view of the clearance operative positions above the support blocks 28, by operation of their associated piston and cylinder assemblies 32 and FIG. 10, shows this operation already completed.

Figure 11:
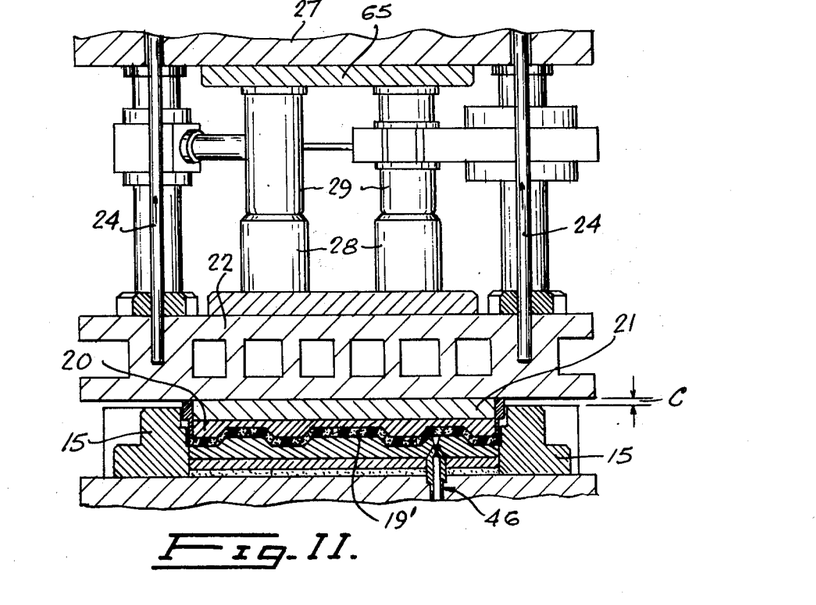
FIGS. 11, 12 and 13 are portions of the machine in FIG. 10, each view illustrating a successive step in the method.
Figure 12:
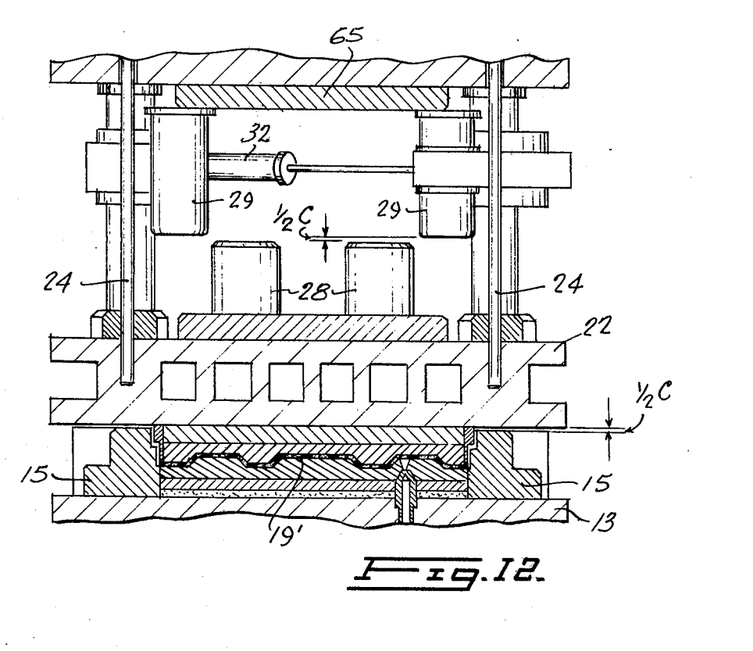

The next step in the process is to operate the cylinders 26 so as to raise the movable platen 22 by a distance equal to the clearance C, thus bringing the upper surfaces of the support blocks 28 into firm engagement with the stop blocks 29, as shown in FIG. 11. It should also be mentioned that the upper surfaces of the stop blocks 29 have at all times an easy sliding engagement with a support plate 65 that is secured to the underside of the upper support platen 27, it being unnecessary to provide any specific clearance between these parts, since the weight of the stop blocks 29 will tend to hold them away from the support plate 65 sufficiently to enable the sliding movement to take place.

With the parts now in this slightly elevated position, there will be a clearance C between the under-surface of the movable platen 22 and the upper surfaces of the side and end blocks 14 and 15. Also, since the upper mold member 20 will have been elevated with the movable platen 22 to which it is connected, the cavity 19 will be deeper in the FIG. 11 position than it was in the FIG. 10 position by an amount equal to the distance C.

An injection molding step is now performed, employing the injection nozzles 46 in the manner already described. During this molding step, large pressures may be built up in the mold cavity 19, as the foamable plastic impinges on the mold portion carried by the mold member 20, these pressures must be withstood by the movable platen 22. They are transferred from the platen 22 to the stop means consisting of the support blocks 28 and the stop blocks 29 to the support plate 65 and the upper support platen 27 and posts 10. The cylinders 26 are not required to withstand these forces.

When the injection molding step has been completed and the pins 54 of the injection nozzles 46 have been returned to their upper (valving) positions, the cylinders 26 will be actuated to force the movable platen 22 downwardly again to some extent. The downward travel of the platen 22 at this time need not be as great as the distance C, although it can be. Merely by way of example, it has been shown as having a distance equal to ½ C, but this proportion can be varied as desired. It is merely sufficient that the downward movement of the platen 22 be adequate to create enough clearance between the support blocks 28 and the stop blocks 29 to permit these readily to be moved out of their aligned positions into their inoperative positions, as has been shown in FIG. 12. In practice for most moldings, this downward movement need only be quite small, for example, as small as 0.010 inch.

This downward movement of the platen 22 will also involve compression of the product forming in the mold cavity 19. It is one of the important features of the present invention that the method takes advantage of the fact that foam plastic products can be so compressed without harming them, provided this is done at the correct time, namely after the skin of the product has formed but before final rigidification of the product that is before they have cooled below their thermoplastic temperature. The gaseous bubbles inside the material permit the product to be compressed at this stage of its formation. Such compression is partly elastic but mainly permanent. This compression at the "almost set" stage, not only slightly compacts the body of the product, but also forces the still somewhat viscous material of the skin into contact with the molding surfaces of and all the fine crevices of the mold members 16 and 20, thus producing a product that more accurately reproduces the mold surface in respect of fine detail than is possible without the compression step.

It is important to note that this compression step is different and distinct from the pressurizing effect that is created by the high pressure injection of the plastic material during the injection step. It should be noted that if the force of the injection step is sufficient to open the mold to provide a cavity of greater volume it is immaterial whether the movable platen engages the stop means or not when the material is injected. If however, the energy of the injected material is not sufficient to open the mold to provide a cavity of greater volume the movable platen should be positioned against the stop means prior to completion of expansion of the foamable plastic material. The compression step takes place after the injection step is complete and the injection nozzles 46 have been closed off by movement of their pins 54 to the valving position. The compression step is essentially carried out by movement of the platens and hence the mold members together, i.e. by reducing the volume of the mold cavity to provide the cavity of lesser volume. This method of reducing the cavity volume to compress the material in the mold provides the improvement in surface detail reproduction referred to above.

As soon as the stop blocks 29 have been moved out of the way, so as effectively to unlock the platen 22 as far as upward movement is concerned, the increased downward pressure on the platen 22 exerted by the cylinders 26 can be released. The considerable weight of the platen 22 and associated parts will still hold the mold cavity closed, and this condition will be maintained until the product has completely set and become rigid. Finally, the cylinders 26 will be operated to elevate the platen 22 to the position seen in FIG. 13, the back-up plate 21, mold member 20 and wear plates 40 being elevated with the platen 22. The ejector pins 46 can then be operated to raise the final product 19' above the lower mold member 16 for removal.

During the time when the platen 22 is pressed firmly down against the side and end blocks 14 and 15 (FIG. 10), or when the normal clearance between these parts is reduced to a fraction of C (FIG. 12), the air spaces in the chambers 42 formed between the blocks 14, 15 and the wear plates 40 provide the necessary clearance.

Figure 14:
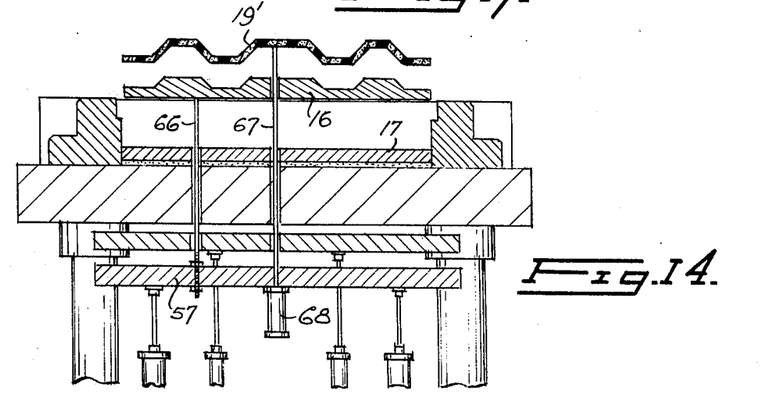
FIG. 14 is a side view of a lower portion of the machine illustrating an alternative method of ejection.

FIG. 14 illustrates an alternative construction in which the lower mold member 16 can be elevated above the lower back-up plate 17 by ejector pins 66 (of which only a representative one has been shown in FIG. 14), the pins 66 being operated from the ejector plate 57, as before. The plate 57 supports a number of further ejector pins 67 (only one shown) which can be elevated relative to the plate 57 by individual piston and cylinder assemblies 68 to raise the product 19' from the mold member 16. This alternative construction has the advantage that the initial upward movement of the product 19' from the mold cavity is carried out while such product is still supported on the lower mold member 16.

It will be noted that the construction is such that the mold members, when opening, define peripheral parting planes, such as those along which the vents 41 extend, that extend in the direction of platen movement and hence generally perpendicular to the main plane that the mold cavity 19 defines. Of course, the cavity 19 may include numerous irregularities, but it nevertheless "generally" defines a main plane that is horizontal, in the vertical machine orientation adopted.

An important advantage of the present apparatus is the manner in which the injection force (the force urging the platens 22 and 13 apart during the injection step) is resisted by the stop blocks 29 and hence by tension in the posts 10. This is in contrast to the conventional manner of holding the platens together during the injection step, namely by means of the main operating cylinders, e.g. the cylinders 26 in the present machine. For such cylinders to resist the large forces involved requires them to be of massive construction, with consequential dimensioning of the other parts of the machine. In the present machine, by virtue of the stop blocks 29 and their associated mechanisms, the operating cylinders 26 are entirely relieved of any need to resist the molding pressure. This enables these cylinders to be very appreciably simpler and less massive than has been necessary in prior machines, a result that in turn leads to a general simplification and lightening of many other parts of the machine.

As will be apparent, the compression step could be achieved by upward movement of the lower platen instead of, or as well as, downward movement of the upper platen. The important consideration is that the platens are effectively moved together, i.e. relative to each other.

Figure 15:
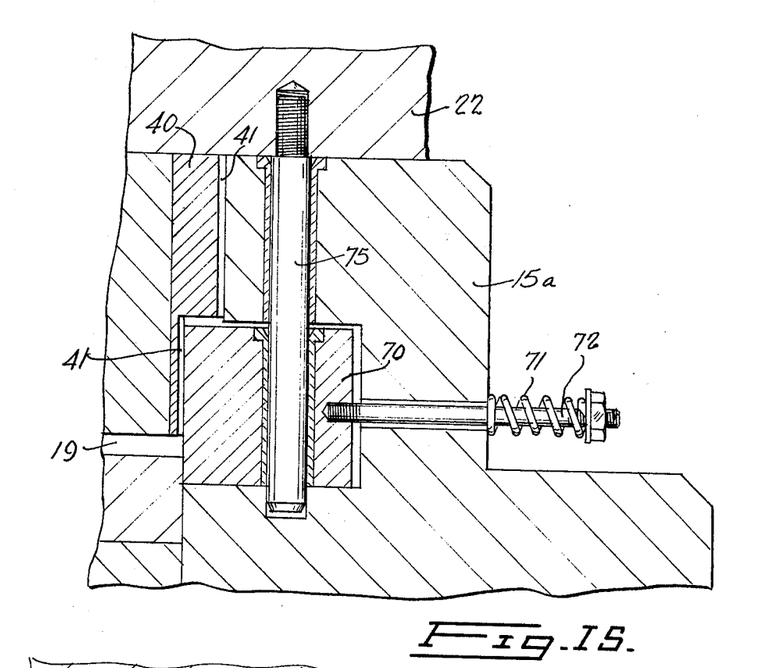
FIG. 15 is a view similar to FIG. 5 showing a modification.
Figure 16:
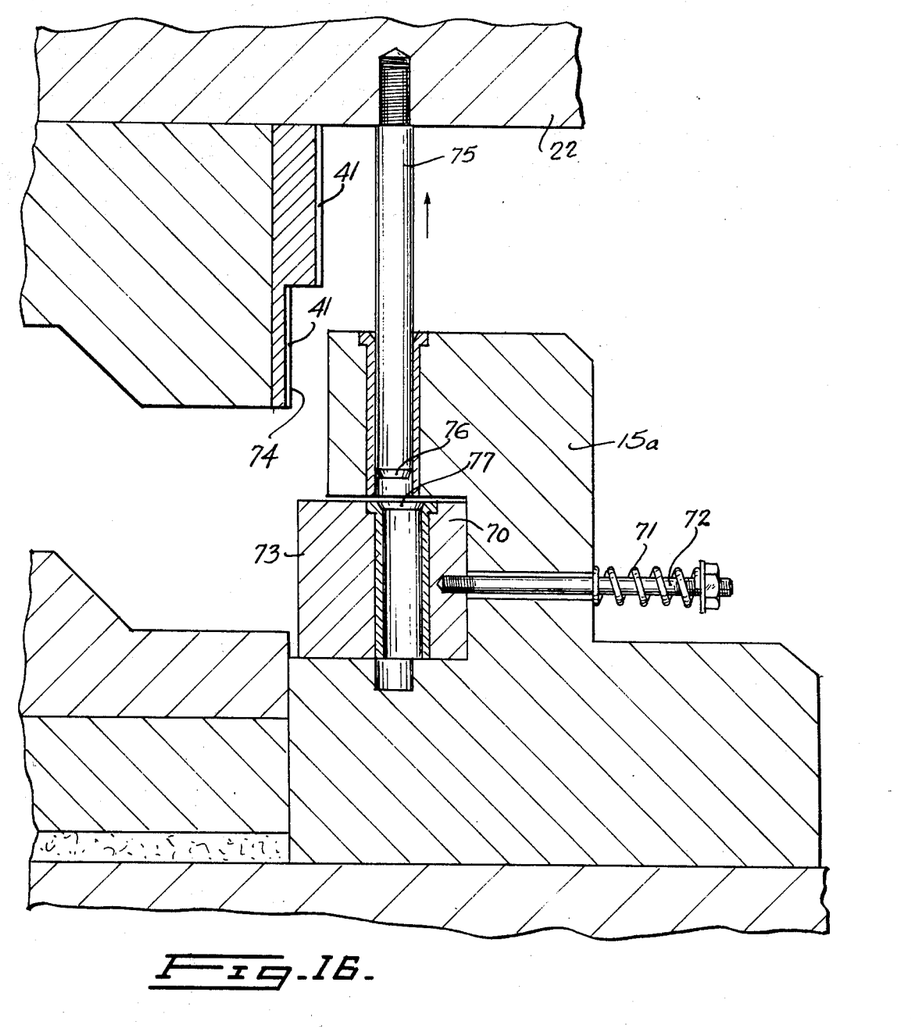
FIG. 16 is a view of FIG. 15 with the parts in a different position.

FIGS. 15 and 16 show a modified form of end block 15a containing a slidably mounted end block mold member 70 that is urged by a spring 71 acting through a pin 72 into an outward position (FIG. 16). In this outward position a surface 73 of the member 70 is withdrawn from the plane of movement of the surface 74 of the wear plate 40 and from the edge of the product formed in the mold cavity 19, thus providing clearance for removal of such product.

A pin 75 connected to the movable platen 22 slides in the end block 15a. Upon lowering of the platen 22, a bevelled end 76 on the pin 75 engages a complementary socket 77 in the member 70, thus forcing the member 70 to the left, i.e. to the position shown in FIG. 15. The surface 73 can now act as a mold cavity surface, in the sense that details required on the end surface of the product can be formed on such surface 73 for reproduction during the molding step, such details not being removed upon ejection of the product because of the clearance provided by the spring retraction of the member 70 upon lifting of the platen 22 and removal of the pin 75 from the member 70.

Similar arrangements can be provided for slidably mounting a mold member in the end block at the other end of the mold and for slidably mounting a side mold member in the side blocks 14, all for sliding towards and away from the mold cavity under the control of the vertical movement of the platen 22.

Figure 17:
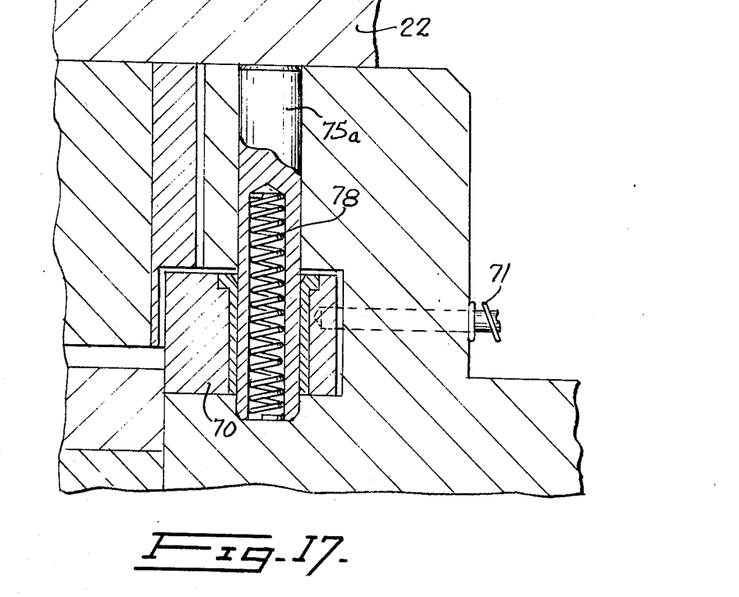
FIG. 17 is a view similar to FIG. 15, but showing a further modification.

An alternative construction is shown in FIG. 17 where the pin 75a is not connected to the platen 22 but is urged upwardly by a spring 78. When the platen 22 rises, the pin 75a follows, being forced up by the spring 78 to rise sufficiently to allow the mold member 70 to be withdrawn by the spring 71, as before. When the platen is again lowered it forces the pin 75a back to the downward position shown, and consequently the member 70 back to the inward position shown.

By way of further illustration, a reciprocating screw injection molding machine having a shot capacity of 3 ounces is fitted with a mold assembly in accordance with the present invention having the basic function of the apparatus as depicted in the FIGS. 1–4. The mold employed has a cavity having a width of 3¼ inches and a length of 15 inches, the height of the mold cavity is variable. A particulate rubber reinforced impact polystyrene having disposed on the surface of the granules about two weight percent of a foaming agent sold under the trade designation of FICEL EPA is employed as feed. The barrel temperature is adjusted to 350°F., the mold maintained at a temperature of 100°–110°F. and the machine has a shut-off nozzle that is maintained at a temperature of 450°F. The volume of the mold is adjusted by means of removable spacers about the periphery of the mold to provide a mold of greater volume and by removal of spacers to provide a mold of lesser volume, the mold cavity of greater volume has a height of about 0.25 inches and at lesser volume a height of about 0.20 inches. On filling of the mold cavity of greater volume, the mold is filled to almost total capacity, however, minor rounding of the injection molded foam is observed adjacent the corners. After filling the mold of major volume, the spacers are removed and the mold closed to provide a mold height of about 0.20 inches, the foamed injection molded part is cooled and subsequently removed from the mold. Repetition of the foregoing procedure results in rectangular moldings having a high quality surface, that is, a substantial reduction in the so-called swirl or the surface non-uniformity usually associated with the so-called "low pressure" foam injection molding process. When the foregoing procedure is repeated with the exception that the mold cavity of greater volume only or the cavity of lesser volume only is employed, a significantly inferior surface is obtained which shows swirl marks and a non-uniform appearance to the surface. When the foregoing is repeated using a pigmented polymer composition, the apparent color of the surface is darker and much more uniform when the mold is reduced in volume while the injection mass is still soft enough to be deformed. If the softened mass is not reduced in volume by employing the cavity of lesser volume, the apparent color of the surface varies considerably.

I claim:
1. A method for manufacturing a foam plastic product by injection molding of a heat plastified synthetic resinous thermoplastic material employing a mold, the mold having members being supported on platens, the platens are movably positioned relative to each other and the mold members are closable to define a mold cavity by selectively positioning the platens, the mold cavity being adjustable by movement of the platens supporting the mold members to define a cavity of lesser volume or a cavity of greater volume, the steps of the method comprising
   closing the mold to form the cavity of greater volume,
   injecting into said cavity having a volume at least adjustable to define said cavity of greater volume from a means to supply a heat plastified synthetic resinous composition which foams under atmospheric pressure, a heat plastified synthetic resinous composition to fill said sufficient quantity of said mold cavity of greater volume upon foaming with said foamed synthetic resinous composition,
   positioning at least one of the platens to form the mold cavity of lesser volume while the synthetic resinous composition is still in thermoplastic deformable state to compress the composition, cooling the composition within the mold and subsequently removing a cooled rigid composition from the mold to thereby provide a molded foam plastic article that more accurately reproduces the mold surface than is possible without compressing during molding.

2. The method of claim 1 including supporting the platen carrying a mold member which is remote from a location of injection of the synthetic resinous composition by a stop means to prevent movement of the mold member and platen during injection.

3. The method of claim 2 wherein during injection the synthetic resinous composition impinges on a mold portion adjacent the stop means.

4. The method of claim 1 including block means extending around at least a portion of the periphery of at least one mold member for defining the edge of said cavity and moving said block means toward said cavity in a direction generally parallel to a platen to engage the synthetic resinous composition and away from the cavity to provide clearance for removal of the product therefrom on moving of the platens apart.

5. A method for manufacturing a foam plastic product by injection molding of a heat plastified synthetic resinous thermoplastic material employing a mold, the mold having mold portions supported on first and third platens which are movably supported relative to each other by a hydraulic cylinder, the first and second platen being affixed to each other by a plurality of posts, the third platen being slidably supported on the posts and positionable by means of a hydraulic cylinder between the first and second platens, the mold defining a mold cavity wherein the mold portions are positioned together by moving the third platen relative to the first platen, the mold cavity being adjustable from a cavity of lesser volume to a cavity of greater volume by movement of third platen, the steps of the method comprising closing the mold, interposing between the third platen and the second platen at least one stop member to limit movement of the third platen toward the second platen whereby the mold will open to form said cavity of greater volume, injecting into the cavity having a volume at least adjustable to define said cavity of greater volume from a means to supply the heat plastified synthetic resinous composition which foams under atmospheric conditions a sufficient quantity of said heat plastified resinous composition to fill said mold cavity of greater volume upon foaming said with foamed composition, positioning the movable third platen by means of the hydraulic cylinder to form a mold cavity of lesser volume while the synthetic resinous composition is still in a thermoplastic deformable state, thereby compressing the composition rigidifying the composition within the mold cavity of lesser volume and subsequently disengaging the stop means, retracting the movable platen and removing a formed plastic product from the mold to thereby provide a molded foam plastic article that more accurately reproduces the mold surface than is possible without compressing during molding.

6. The method of claim 5 including block means extending around at least a portion of the periphery of at least one mold member for defining the edge of said cavity and moving said block means toward said cavity in a direction generally parallel to a platen to engage the synthetic resinous composition and away from the cavity to provide clearance for removal of the product therefrom on moving of the platens apart.

* * * * *

UNITED STATES PATENT AND TRADEMARK OFFICE
CERTIFICATE OF CORRECTION

PATENT NO. : 3,983,196
DATED : September 28, 1976
INVENTOR(S) : Charles H. Gray

It is certified that error appears in the above-identified patent and that said Letters Patent are hereby corrected as shown below:

Column 4, line 10, before "injection" insert --each--;

Column 8, line 59, after "a" insert --sufficient quantity of said--;

Column 8, line 60, after "said", delete "sufficient quantity of";

Column 8, line 61, before "mold" delete "said";

Column 10, line 8, before cavity, delete "the" and insert --said--; and

Column 10, line 14, delete "said with" and insert --with said--.

Signed and Sealed this

Eleventh Day of October 1977

[SEAL]

Attest:

RUTH C. MASON
Attesting Officer

LUTRELLE F. PARKER
Acting Commissioner of Patents and Trademai